(12) United States Patent
Muroya et al.

(10) Patent No.: US 11,081,752 B2
(45) Date of Patent: Aug. 3, 2021

(54) SQUARE SECONDARY BATTERY AND METHOD OF MANUFACTURING SAME

(71) Applicant: SANYO ELECTRIC CO., LTD., Daito (JP)

(72) Inventors: Yohei Muroya, Hyogo (JP); Shinichirou Yoshida, Hyogo (JP); Hiroshi Maesono, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 609 days.

(21) Appl. No.: 15/814,742

(22) Filed: Nov. 16, 2017

(65) Prior Publication Data

US 2018/0175334 A1 Jun. 21, 2018

(30) Foreign Application Priority Data

Dec. 21, 2016 (JP) .............................. JP2016-247953

(51) Int. Cl.
  *H01M 2/04* (2006.01)
  *H01M 2/02* (2006.01)
  *H01M 50/166* (2021.01)
  *H01M 50/543* (2021.01)

(52) U.S. Cl.
  CPC ....... *H01M 50/166* (2021.01); *H01M 50/543* (2021.01)

(58) Field of Classification Search
  CPC ............ H01M 2/21; H01M 2/22; H01M 2/26; H01M 2/43; H01M 2/0473
  See application file for complete search history.

(56) References Cited

U.S. PATENT DOCUMENTS

| | | | |
|---|---|---|---|
| 2010/0279156 A1 | 11/2010 | Kim et al. | |
| 2012/0058374 A1* | 3/2012 | Aota | B23K 35/365 429/94 |
| 2013/0316225 A1 | 11/2013 | Ito et al. | |
| 2016/0049635 A1* | 2/2016 | Park | H01M 2/263 429/161 |
| 2016/0301041 A1 | 10/2016 | Kim et al. | |
| 2019/0019633 A1* | 1/2019 | Ito | H01G 11/70 |
| 2019/0173062 A1* | 6/2019 | Egawa | H01M 2/06 |

FOREIGN PATENT DOCUMENTS

JP          2011-18645 A          1/2011

* cited by examiner

*Primary Examiner* — Stephan J Essex
(74) *Attorney, Agent, or Firm* — Westerman, Hattori, Daniels & Adrian, LLP (57) ABSTRACT

A square secondary battery includes an electrode body including a positive electrode plate and a negative electrode plate, a square outer package housing the electrode body, a metal sealing plate sealing an opening of the square outer package, and a positive electrode collector electrically connected to the positive electrode plate and the sealing plate. The positive electrode collector includes a base portion disposed to oppose the sealing plate, and a lead portion extending from an edge portion of the base portion towards the electrode body. In a short direction of the sealing plate, a boundary between the base portion and the lead portion is positioned on a first side with respect to a center of the sealing plate, and a connection between the sealing plate and the base portion of the positive electrode collector is offset to a second side with respect to the center of the sealing plate.

10 Claims, 9 Drawing Sheets

SQUARE SECONDARY BATTERY AND METHOD OF MANUFACTURING SAME

CROSS REFERENCE TO RELATED APPLICATIONS

The present invention application claims priority to Japanese Patent Application No. 2016-247953 filed in the Japan Patent Office on Dec. 21, 2016, the entire contents of which are incorporated herein by reference.

BACKGROUND OF THE INVENTION

Field of the Invention

The present disclosure relates to a square secondary battery and a method of manufacturing the same.

Description of Related Art

Square secondary batteries such as alkaline secondary batteries and nonaqueous electrolyte secondary batteries are used in power sources for driving electric vehicles (EV), hybrid electric vehicles (HEV, PHEV), and the like.

In such square secondary batteries, a battery case includes a bottomed tubular square outer package including an opening and a sealing plate that seals the opening of the outer package. The battery case accommodates therein an electrode body including a positive electrode plate, a negative electrode plate, and a separator, and an electrolyte. A positive electrode external terminal and a negative electrode external terminal are attached to the sealing plate with an insulating member in between. The positive electrode terminal is electrically connected to the positive electrode plate through a positive electrode collector, and the negative electrode terminal is electrically connected to the negative electrode plate through a negative electrode collector.

Furthermore, as disclosed in Japanese Published Unexamined Patent Application No. 2011-18645 (Patent Document 1), a secondary battery has been proposed in which a positive electrode collector is connected to a surface of the sealing plate on an inner side of the battery, in which the battery case serves as a positive electrode terminal as well. Such a configuration is advantageous in that the number of components can be reduced.

However, the method for connecting the positive electrode collector and the sealing plate to each other has not been taken into consideration in detail.

BRIEF SUMMARY OF THE INVENTION

In secondary batteries employed for, for example, power sources for driving electric vehicles, hybrid electric vehicles, and the like, the conductive path from the electrode body to the outside of the battery is required to have a strong structure that is not easily broken or damaged even when a strong impact or vibration is applied thereto.

An object of the claimed disclosure is to provide a square secondary battery with more reliability and a method of manufacturing the same.

A square secondary battery that is an aspect of the present disclosure includes an electrode body that includes a first electrode plate and a second electrode plate, a square outer package that includes an opening and that houses the electrode body, a sealing plate that seals the opening, and a collector connected to the first electrode plate. In the square secondary battery, the collector includes a base portion disposed to oppose the sealing plate, and a lead portion that extends from an edge portion of the base portion towards the electrode body, the sealing plate and the base portion are connected to each other, and in a short direction of the sealing plate, a boundary between the base portion and the lead portion is positioned on a first side with respect to a center of the sealing plate, and a connection between the sealing plate and the base portion is offset to a second side with respect to the center of the sealing plate.

In a case in which the collector is directly connected to the sealing plate, the square secondary battery will have more reliability regarding the sealing property thereof and will have less number of parts. However, the inventors have found that the following issue exists in a square secondary battery with such a mode.

In a case in which a lead portion is provided at an edge portion of a base portion of a collector in a short direction of a sealing plate, the configuration of the square secondary battery is simpler. However, in a case in which a strong impact or vibration is applied to the square secondary battery, and force that moves the electrode body inside the square outer package is applied, the collector is pulled by the electrode body, and a load is applied to a connection between the sealing plate and the collector; accordingly, there is a concern that the connection will be damaged or broken.

In the square secondary battery according to an aspect of the present disclosure, the boundary between the base portion of the collector and a lead portion of the collector is, in the short direction of the sealing plate, positioned on the first side with respect to the center of the sealing plate, and the connection between the sealing plate and the collector is offset to the second side with respect to the center of the sealing plate. Accordingly, the connection between the sealing plate and the collector is at a position that is farther away from the boundary between the base portion and the lead portion of the collector. Accordingly, even in a case in which the collector is pulled by the electrode body, application of a load to the connection between the sealing plate and the collector can be suppressed. Accordingly, a square secondary battery with higher reliability in which damage and breakage to the connection between the sealing plate and the collector are suppressed is obtained.

Desirably, a connection opening is formed in the base portion, a projection is formed on a surface of the sealing plate on an electrode body side, the projection is disposed inside the connection opening, the projection and the base portion are welded to each other, and the connection includes the projection and the connection opening. With such a configuration, the sealing plate and the collector are connected to each other in a further firm manner. Accordingly, the square secondary battery with a higher reliability is obtained.

Desirably, in the short direction of the sealing plate, the projection is entirely positioned on the second side with respect to the center of the sealing plate. With the above, damage or breakage to the connection between the sealing plate and the collector can be prevented in a further effective manner.

Desirably, a distal end recess is formed in the distal end of the projection.

Desirably, an annular thin wall portion is provided around the connection opening, an annular projection is formed in an edge portion of the connection opening, and the annular projection is welded to the base portion.

Desirably, the lead portion is provided with a first bend portion and a second bend portion that extend in a longitudinal direction of the sealing plate, in a direction perpendicular to the sealing plate, the first bend portion is positioned on a sealing plate side with respect to the second bend portion, and in the short direction of the sealing plate, the first bend portion is positioned on an outer side with respect to the second bend portion. With such a configuration, the force of the electrode body pulling the collector can be absorbed in the first bend portion and the second bend portion; accordingly, application of a load to the connection between the sealing plate and the collector can be suppressed in a further effective manner. Accordingly, the square secondary battery with a higher reliability is obtained.

A method of manufacturing a square secondary battery, which is an aspect of the present disclosure and which includes an electrode body that includes a first electrode plate and a second electrode plate, a square outer package that includes an opening and that houses the electrode body, a sealing plate that seals the opening, and a collector connected to the first electrode plate, in which the collector includes a base portion disposed to oppose the sealing plate, and a lead portion that extends from an edge portion of the base portion towards the electrode body, and in which the sealing plate and the base portion are connected to each other, includes a first step of connecting the sealing plate and the base portion to each other so that a connection between the sealing plate and the base portion is formed at a position offset from a center of the sealing plate in a short direction of the sealing plate, a second step of, after the first step, bending the collector and setting a state in which, in the short direction of the sealing plate, a boundary between the base portion and the lead portion is positioned on a first side with respect to a center of the sealing plate, and the connection is offset to a second side with respect to the center of the sealing plate, and a third step of connecting the first electrode plate to the lead portion after the second step.

Rather than connecting the collector in which the base portion has been pre-bent with respect to the lead portion to the sealing plate, it is desirable to connect the collector before bending to the collector. With such a method, a portion of the collector serving as the lead portion can be prevented from blocking the process of connecting the collector to the sealing plate. With the above, increase in the quality of the connection between the sealing plate and the collector can be further facilitated.

In the method of manufacturing a square secondary battery, which is an aspect of the present disclosure, the boundary between the lead portion of the collector and the base portion of the collector is, in the short direction of the sealing plate, positioned on the first side with respect to the center of the sealing plate, and the connection between the sealing plate and the base portion of the collector is offset to the second side with respect to the center of the sealing plate. Accordingly, when the collector is bent at the position serving as the boundary between the base portion and the lead portion, application of a load to the connection between the sealing plate and the collector can be suppressed. Accordingly, a square secondary battery with higher reliability in which damage and breakage to the connection between the sealing plate and the collector are suppressed is obtained.

Desirably, in the first step, using the collector in which a connection opening is formed in the base portion, and the sealing plate on which a projection is formed, the projection is disposed inside the connection opening and the projection and the base portion are welded to each other.

Desirably, in the short direction of the sealing plate, the projection is entirely positioned on the second side with respect to the center of the sealing plate.

Desirably, the lead portion is provided with a first bend portion and a second bend portion that extend in a longitudinal direction of the sealing plate, in a direction perpendicular to the sealing plate, the first bend portion is positioned on a sealing plate side with respect to the second bend portion, and in the short direction of the sealing plate, the first bend portion is positioned on an outer side with respect to the second bend portion.

The present disclosure provides a square secondary battery with a higher reliability.

DETAILED DESCRIPTION OF THE INVENTION

A configuration of a square secondary battery 20 according to an exemplary embodiment will be described below. Note that the present disclosure is not limited to the following exemplary embodiment.

Figure 1:
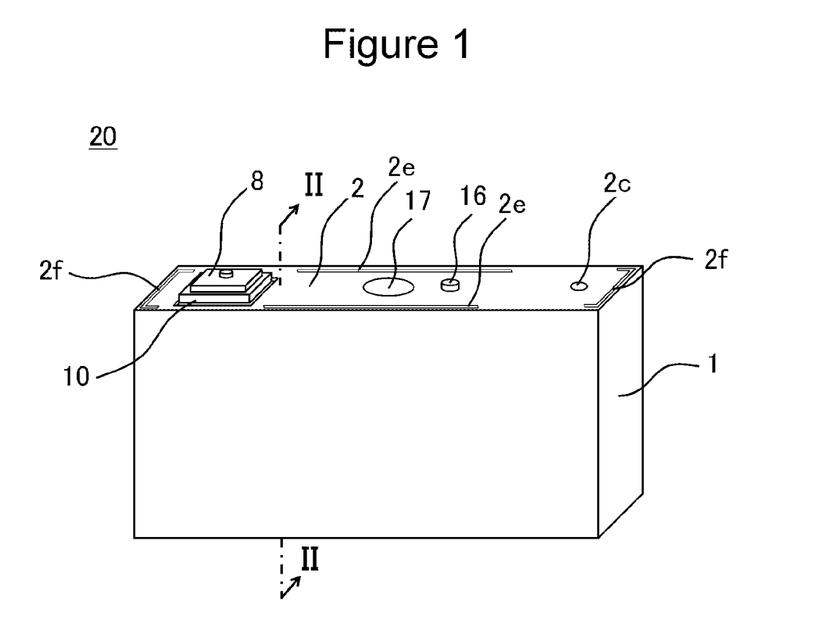
FIG. 1 is a perspective view of a square secondary battery according to an exemplary embodiment.
Figure 2:
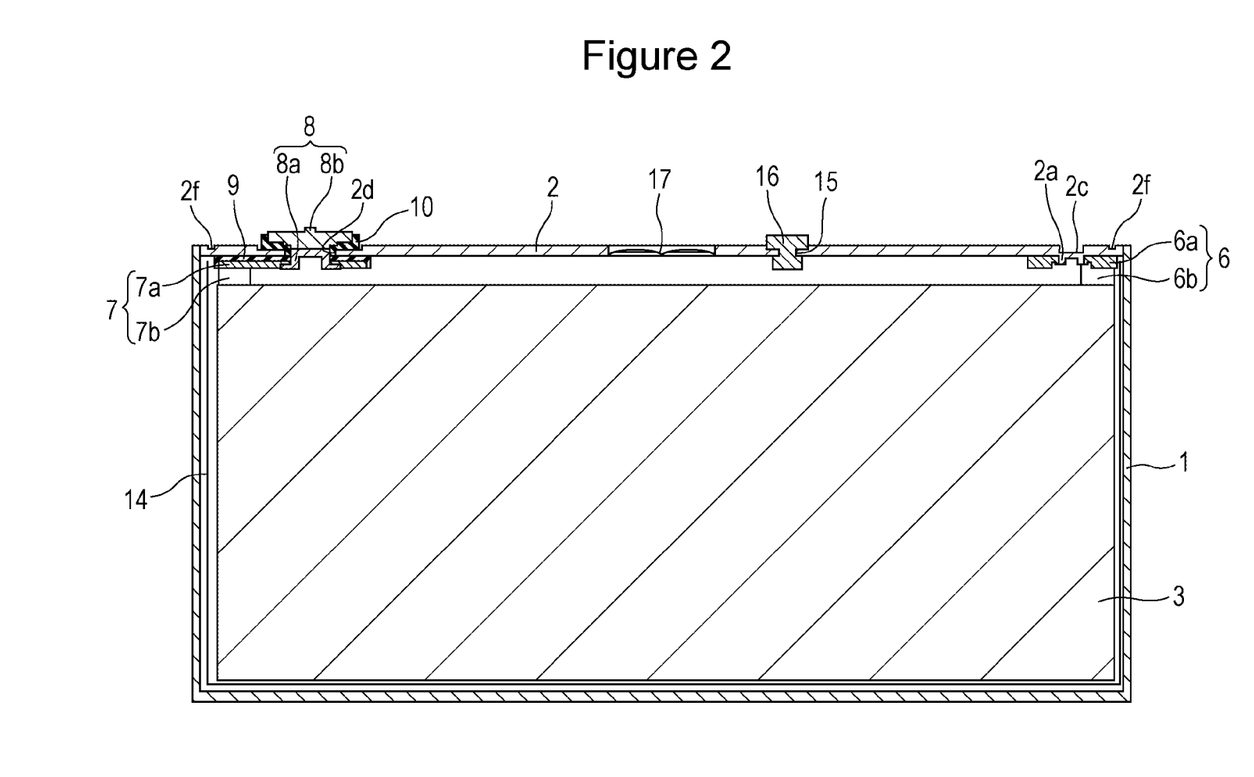
FIG. 2 is a cross-sectional view taken along line II-II in FIG. 1.

FIG. 1 is a perspective view of the square secondary battery 20. FIG. 2 is a cross-sectional view taken along line II-II in FIG. 1. As illustrated in FIGS. 1 and 2, the square secondary battery 20 includes a battery case formed of a bottomed and tubular square outer package 1 including an opening, and a sealing plate 2 that seals the opening of the square outer package 1. The square outer package 1 and the sealing plate 2 are, desirably, formed of metal and are, desirably, formed of aluminum or an aluminum alloy, for example. An electrode body 3 in which at least one positive electrode plate and at least one negative electrode plate are stacked or wound with at least one separator interposed therebetween are housed in the square outer package 1 together with an electrolyte. An insulation sheet 14 is disposed between the electrode body 3 and the square outer package 1.

A positive electrode collector 6 is connected to the positive electrode plate constituting the electrode body 3. The positive electrode collector 6 is connected to a surface on the inner side of the battery of the sealing plate 2. With the above, the positive electrode plate is electrically connected to the sealing plate 2 through the positive electrode collector 6. The positive electrode collector 6 is, desirably, formed of metal and is, desirably, formed of aluminum or an aluminum alloy.

A negative electrode collector 7 is connected to the negative electrode plate constituting the electrode body 3. The negative electrode collector 7 is connected to a negative electrode external terminal 8. An inner side insulating member 9 is disposed between the negative electrode collector 7 and the sealing plate 2. An external side insulating member 10 is disposed between the negative electrode external terminal 8 and the sealing plate 2. With the above, the negative electrode collector 7 and the negative electrode external terminal 8 are insulated from the sealing plate 2. The negative electrode collector 7 is, desirably, formed of metal and is, desirably, formed of copper or a copper alloy. The inner side insulating member 9 and the external side insulating member 10 are, desirably, formed of resin. The negative electrode external terminal 8 is, desirably, formed of metal and is, desirably, formed of copper or a copper alloy. Furthermore, as illustrated in FIG. 2, desirably, the negative electrode external terminal 8 includes the first metal portion 8a disposed on the inner side of the battery, and the second metal portion 8b disposed on the external side of the battery. In the above, the first metal portion 8a is desirably formed of copper or a copper alloy. Desirably, the second metal portion 8b is formed of aluminum or an aluminum alloy. Such a configuration allows a bus bar formed of aluminum or an aluminum alloy to be suitably used as a bus bar that connects a positive electrode terminal of a square secondary battery on one side and a negative electrode terminal of a square secondary battery on the other side when a battery pack is fabricated using a plurality of square secondary batteries. Note that desirably, a nickel layer is formed on the surface of the first metal portion 8a.

A gas discharge valve 17 that breaks when the pressure inside the battery case becomes equivalent to or larger than a predetermined value and that discharges gas inside the battery case to the outside of the battery case is provided in the sealing plate 2. An electrolyte injection hole 15 is provided in the sealing plate 2, and the electrolyte injection hole 15 is sealed with a sealing plug 16 after the electrolyte is injected inside the battery case.

A method for manufacturing the square secondary battery 20 will be described next. Note that in the square secondary battery 20 according to the exemplary embodiment, the positive electrode plate is a first electrode plate, and the negative electrode plate is a second electrode plate.

Fabrication of Positive Electrode Plate

A positive electrode mixture slurry containing lithium-nickel-cobalt-manganese composite oxide as a positive electrode active material, polyvinylidene fluoride (PVdF) as a binding agent, a carbon material as a conductive agent, and N-methyl-2-pyrrolidone (NMP) as a dispersion medium is fabricated. The positive electrode mixture slurry is coated on both surfaces of a long and 15 μm thick aluminum foil serving as a positive electrode core body. Furthermore, by drying the above, NMP in the positive electrode mixture slurry is removed, and positive electrode active material layers are formed on the positive electrode core body. Subsequently, after compressing the positive electrode active material layers to a predetermined thickness, the positive electrode active material layers are cut into a predetermined shape. The positive electrode plate obtained in the above manner includes a positive electrode core body exposed portion 4 in which no positive electrode active material mixture layers are formed at edge portions of the long positive electrode core body in the width direction and in the longitudinal direction on both sides of the positive electrode core body.

Fabrication of Negative Electrode Plate

A negative electrode mixture slurry containing graphite as a negative electrode active material, styrene-butadiene rubber (SBR) as a binding agent, carboxymethyl cellulose (CMC) as a thickener, and water as a dispersion medium is fabricated. The negative electrode mixture slurry is coated on both surfaces of a long copper foil that is 8 μm thick and that serves as the negative electrode core body. Subsequently, by drying the above, the water in the negative electrode mixture slurry is removed and the negative electrode active material layers are formed on the negative electrode core body. Subsequently, after compressing the negative electrode active material layers to a predetermined thickness, the negative electrode active material layers are cut into a predetermined shape. The negative electrode plate obtained in the above manner includes a negative electrode core body exposed portion 5 in which no negative electrode active material mixture layers are formed at edge portions of the long negative electrode core body in the width direction and along the longitudinal direction on both sides of the negative electrode core body.

Fabrication of Electrode Body

Figure 3:
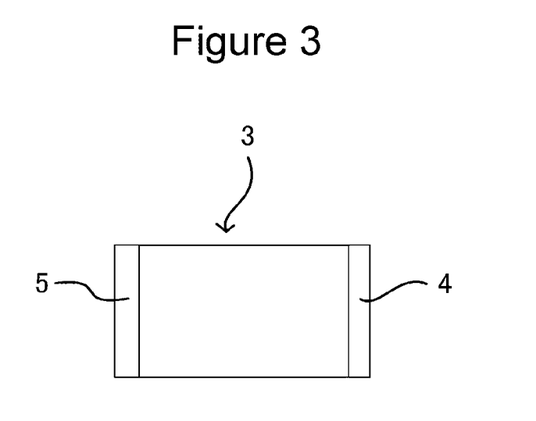
FIG. 3 is a front view of an electrode body according to the exemplary embodiment.

The wound electrode body 3 is fabricated by winding, with the separator interposed in between, the positive electrode plate and the negative electrode plate fabricated in the above manner. As illustrated in FIG. 3, the electrode body 3 includes the wound positive electrode core body exposed portion 4 at a first end portion of the electrode body 3 in the winding axis direction, and a wound negative electrode core body exposed portion 5 at a second end portion. Note that the outermost periphery of the electrode body 3 is, desirably, covered by the separator.

Figure 4:
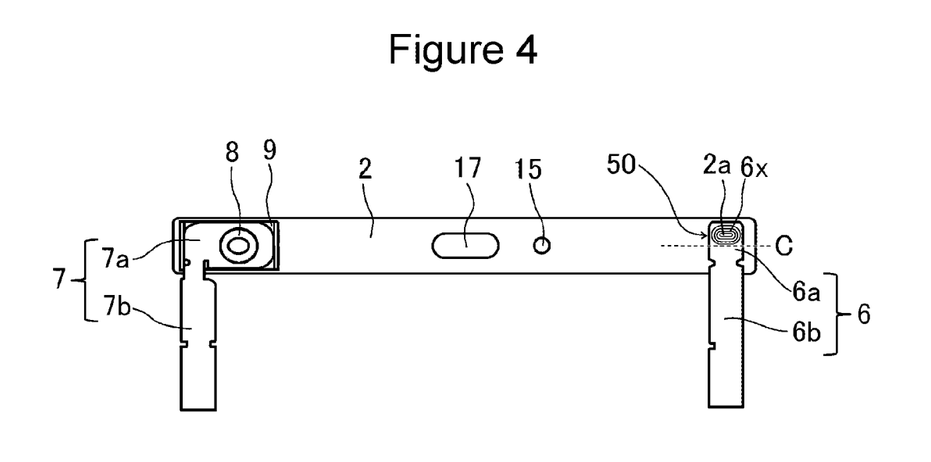
FIG. 4 is a diagram of a surface of a sealing plate on an inner side of the battery after various components have been attached.

Attaching Negative Electrode Collector and Negative Electrode External Terminal to Sealing Plate In a vicinity of a negative electrode terminal attachment hole 2d provided in the sealing plate 2, the inner side insulating member 9 and a base portion 7a of the negative electrode collector 7 are disposed on a battery inner surface side of the sealing plate 2, and the external side insulating member 10 is disposed on a battery outer surface side of the sealing plate 2. Subsequently, the negative electrode external terminal 8 is inserted through the through holes provided in the external side insulating member 10, the sealing plate 2, the inner side insulating member 9, and the base portion 7a of the negative electrode collector 7, and a tip of the negative electrode external terminal 8 is riveted on the base portion 7a of the negative electrode collector 7. With the above, as illustrated in FIGS. 2 and 4, the negative electrode external terminal 8, the external side insulating member 10, the inner side insulating member 9, and the negative electrode collector 7 are fixed to the sealing plate 2. Note that the riveted portion of the negative electrode external terminal 8 and the base portion 7a of the negative electrode collector 7 are, desirably, further welded and connected by laser welding and the like such that a welded connection is formed (not shown).

Attaching Positive Electrode Collector to Sealing Plate

Figure 5:
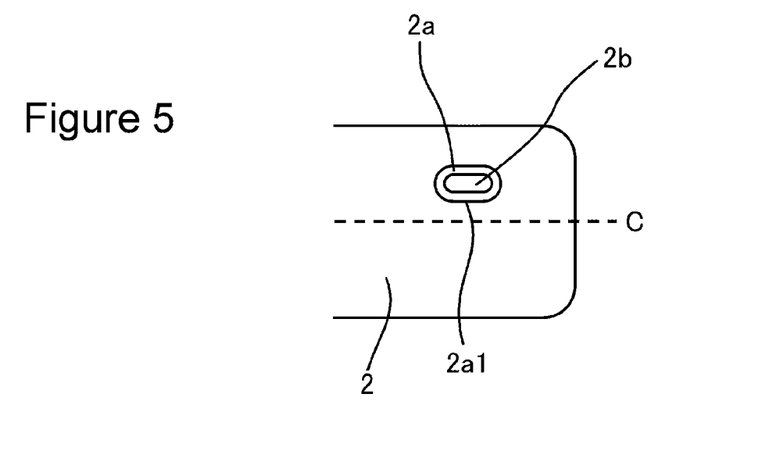
FIG. 5 is a diagram illustrating the surface of the sealing plate on the inner side of the battery and is an enlarged view of a portion near a projection.

As illustrated in FIG. 5, a projection 2a is provided on the surface of the sealing plate 2 on the inner side of the battery. The projection 2a is, in a short direction of the sealing plate 2, offset to a second side (the upper side of FIG. 5) with respect to a center line C of the sealing plate 2. Note that the center line C passes through the center of the sealing plate 2 in the short direction of the sealing plate 2, and extends in the longitudinal direction of the sealing plate 2. A distal end recess 2b is provided in a distal end of the projection 2a. The projection 2a has an elliptic shape in plan view. The projection 2a includes a projected straight portion 2a1 formed in a linear manner.

Figure 6:
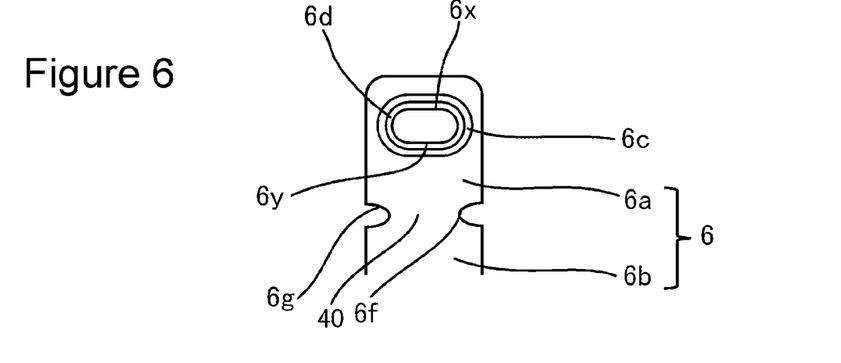
FIG. 6 is a plan view of a positive electrode collector and is an enlarged view near a base portion.

As illustrated in FIG. 6, a connection opening 6x is provided in a base portion 6a of the positive electrode collector 6. The connection opening 6x has an elliptic shape in plan view. An annular thin wall portion 6c is provided around the connection opening 6x. Furthermore, an annular projection 6d is provided in an edge portion of the connection opening 6x. Note that a cut-out portion 6f and a cut-out portion 6g are provided at edge portions of a boundary 40 between the base portion 6a and a lead portion 6b. The connection opening 6x includes a straight portion 6y.

Figure 7:
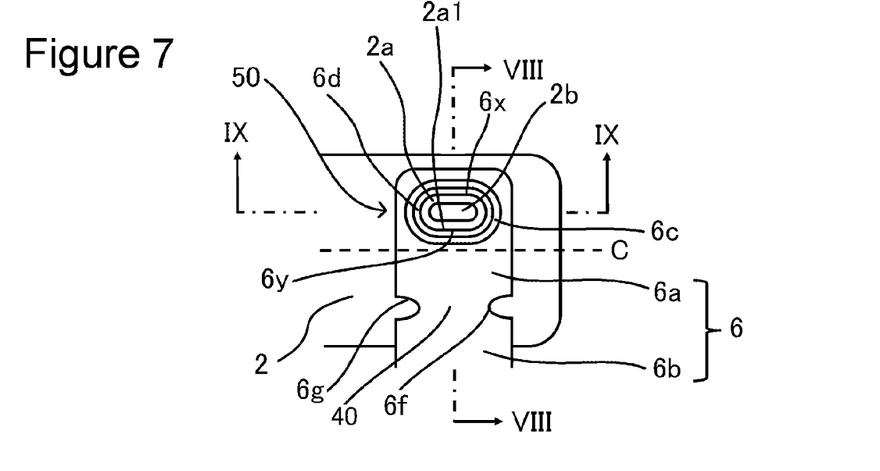
FIG. 7 is a plan view illustrating a state in which the positive electrode collector is disposed on the sealing plate, and is an enlarged view of a portion near a connection between the sealing plate and the positive electrode collector.

FIG. 7 is a diagram illustrating a state in which the positive electrode collector 6 is disposed on the sealing plate 2. Note that in FIG. 7, the lead portion 6b is not bent with respect to the base portion 6a. The projection 2a provided on the sealing plate 2 is fitted to the connection opening 6x provided in the base portion 6a of the positive electrode collector 6. The connection opening 6x is, in the short direction of the sealing plate 2, offset to the second side (the upper side of FIG. 7) with respect to the center line C of the sealing plate 2. Note that as illustrated in FIGS. 7 and 8A, it is desirable that the positive electrode collector 6 is disposed on the sealing plate 2 before the boundary 40 between the base portion 6a and the lead portion 6b is bent.

However, the positive electrode collector 6 on which bending has been performed may be disposed on the sealing plate 2.

Figure 8A:
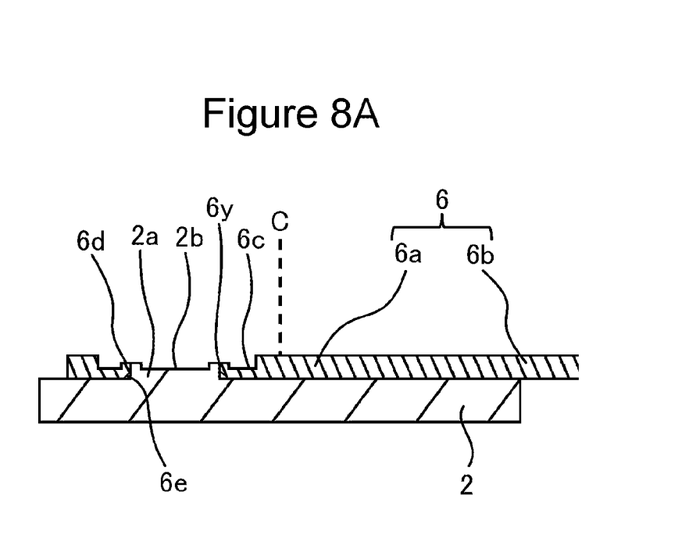
FIG. 8A is a cross-sectional view taken along line VIII-VIII in FIG. 7 and is a diagram illustrating a state before the sealing plate and the positive electrode collector are connected to each other by welding.
Figure 8B:
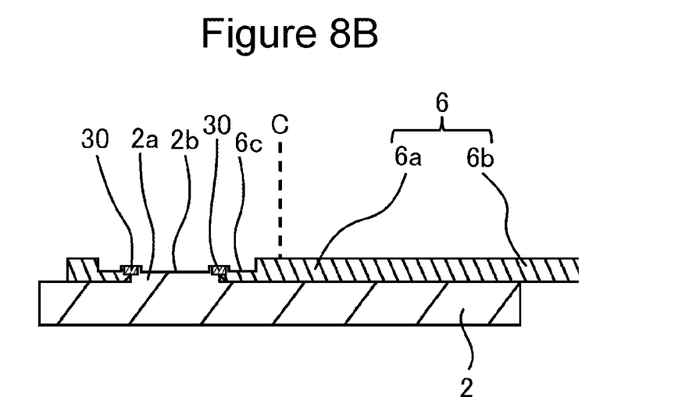
FIG. 8B is a cross-sectional view taken along line VIII-VIII in FIG. 7 and is a diagram illustrating a state after the sealing plate and the positive electrode collector have been connected to each other by welding.
Figure 9A:
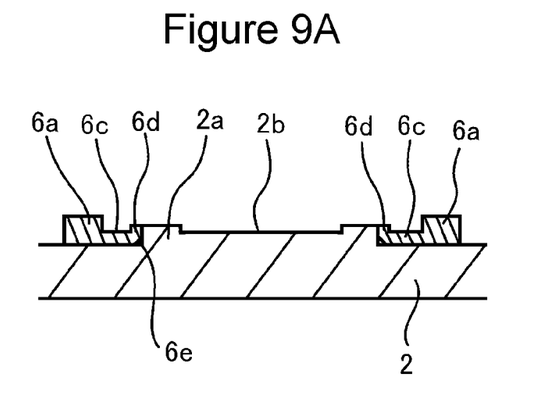
FIG. 9A is a cross-sectional view taken along line IX-IX in FIG. 7 and is a diagram illustrating a state before the sealing plate and the positive electrode collector are connected to each other by welding.
Figure 9B:
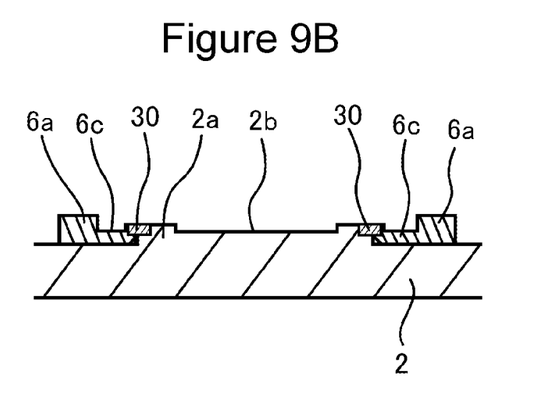
FIG. 9B is a cross-sectional view taken along line IX-IX in FIG. 7 and is a diagram illustrating a state after the sealing plate and the positive electrode collector have been connected to each other by welding.

Referring to FIGS. 8A and 9A, an energy ray, such as a laser, is emitted on the projection 2a of the sealing plate 2 and the edge portion of the connection opening 6x in the base portion 6a. With the above, as illustrated in FIGS. 8B and 9B, welded connections 30 are formed, and the projection 2a of the sealing plate 2 and the base portion 6a are connected by welding. Note that desirably, the welded connections 30 are formed on the annular projection 6d provided in the base portion 6a and on the projection 2a of the sealing plate 2.

Note that desirably, the welded connection 30 is formed along the entire periphery of the edge portion of the connection opening 6x provided in the base portion 6a of the positive electrode collector 6. In such a case, the welded connection 30 is formed annularly in plan view. However, rather than along the entire periphery of the edge portion of the connection opening 6x, welded connections 30 may be formed at a plurality of portions in the edge portion of the connection opening 6x in a separated state.

Note that desirably, the distal end recess 2b is formed in the distal end of the projection 2a provided on the sealing plate 2. With such a configuration, a larger welded connection 30 is formed when the projection 2a of the sealing plate 2 and the edge portion of the connection opening 6x provided in the base portion 6a of the positive electrode collector 6 are welded by projection of an energy ray. Accordingly, the sealing plate 2 and the positive electrode collector 6 are connected to each other in a further firm manner. Accordingly, the square secondary battery with a higher reliability is obtained. Note that the distal end recess 2b is not an essential component.

In the base portion 6a of the positive electrode collector 6, the annular thin wall portion 6c is provided around the connection opening 6x. Furthermore, the annular projection 6d is provided in the edge portion of the connection opening 6x. With such a configuration, a larger welded connection 30 is formed when the projection 2a of the sealing plate 2 and the edge portion of the connection opening 6x provided in the base portion 6a of the positive electrode collector 6 are welded by projection of an energy ray. Accordingly, the sealing plate 2 and the positive electrode collector 6 are connected to each other in a further firm manner. Note that desirably, a distal end (the upper end in FIG. 8A) of the annular projection 6d does not protrude out from a surface (the upper surface in FIG. 8A) of the base portion 6a of the positive electrode collector 6 on the electrode body 3 side. Note that the annular thin wall portion be and the annular projection 6d are not essential components.

As illustrated in FIGS. 8A and 9A, desirably, a tapered portion 6e is formed in the edge portion (the lower edge in FIG. 8A) of the connection opening 6x, which is provided in the base portion 6a of the positive electrode collector 6, on the sealing plate 2 side. With the above, damage can be prevented from being caused to the projection 2a when the projection 2a is inserted into the connection opening 6x.

Note that as illustrated in FIGS. 1 and 2, desirably, a recess 2c is formed in the surface of the sealing plate 2 on the external side of the battery at a position that opposes the projection 2a. Furthermore, desirably, a pair of first groove portions 2e that extend in the longitudinal direction of the sealing plate 2, and a pair of second groove portions 2f that extend in the short direction of the sealing plate 2 are provided in the surface of the sealing plate 2 on the external side of the battery.

Bending of Positive Electrode Collector and Negative Electrode Collector

Bending is performed on the positive electrode collector 6, which is connected to the sealing plate 2, at the boundary 40 between the base portion 6a and the lead portion 6b. In the above, desirably, the lead portion 6b is bent with respect to the base portion 6a while the base portion 6a is pushed against the sealing plate 2.

In the above, in the short direction of the sealing plate 2, the boundary 40 (the bent portion) between the base portion 6a and the lead portion 6b is positioned on the first side with respect to the center line C of the sealing plate 2, and a connection 50 between the sealing plate 2 and the positive electrode collector 6 is offset to the second side with respect to the center line C of the sealing plate 2. Accordingly, the connection 50 between the sealing plate 2 and the positive electrode collector 6 is at a position that is farther away from the boundary 40 (the bent portion) between the base portion 6a and the lead portion 6b. Accordingly, application of a load to the connection 50 between the sealing plate 2 and the positive electrode collector 6 can be suppressed when the lead portion 6b is bent with respect to the base portion 6a. Accordingly, the connection 50 between the sealing plate 2 and the positive electrode collector 6 can be prevented from becoming damaged or broken.

Note that as illustrated in FIG. 7, desirably, the cut-out portion 6g and the cut-out portion 6f are provided in the portion serving as the boundary 40 between the base portion 6a and the lead portion 6b at the edge portions in the width direction. With the above, application of a load to the connection 50 between the sealing plate 2 and the positive electrode collector 6 can be suppressed when the positive electrode collector 6 is bent.

Bending is also performed on the negative electrode collector 7 as well at a boundary between the base portion 7a and a lead portion 7b.

Note that the positive electrode collector 6 and the negative electrode collector 7 are, desirably, flat-plate shaped when attached to the sealing plate 2.

Connecting Positive Electrode Collector and Negative Electrode Collector to Electrode Body The lead portion 6b of the positive electrode collector 6 is connected by welding to the outermost surface of the wound positive electrode core body exposed portion 4 of the electrode body 3. The lead portion 7b of the negative electrode collector 7 is connected by welding to the outermost surface of the wound negative electrode core body exposed portion 5 of the electrode body 3. Note that the connecting method may include resistance welding, ultrasonic welding, laser welding, for example.

Assembling Square Secondary Battery

The electrode body 3 connected to the sealing plate 2 through the positive electrode collector 6 and the negative electrode collector 7 is covered therearound with the insulation sheet 14. Subsequently, the electrode body 3 covered with the insulation sheet 14 is inserted into the square outer package 1. Furthermore, the opening of the square outer package 1 is sealed with the sealing plate 2 by laser welding the square outer package 1 and the sealing plate 2. Subsequently, a nonaqueous electrolyte containing a nonaqueous solvent and electrolyte salt is injected into the square outer package 1 through the electrolyte injection hole 15 provided in the sealing plate 2, and the electrolyte injection hole 15 is sealed with the sealing plug 16. Desirably, a blind rivet is used for the sealing plug 16. Note that a metal sealing plug 16 can be connected to the sealing plate 2 by welding.

Square Secondary Battery 20

Figure 10:
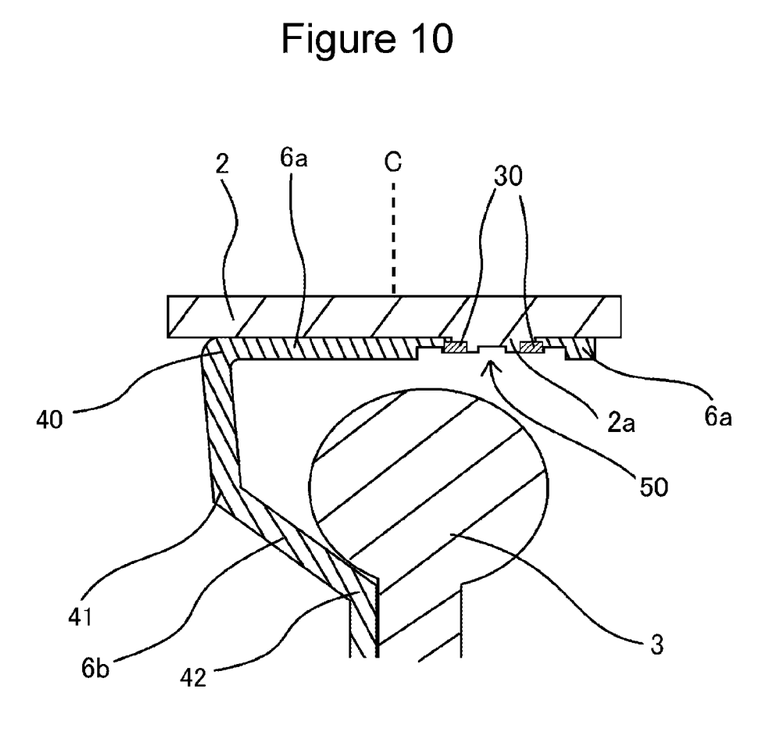
FIG. 10 is a cross-sectional view of a portion near the connection between the sealing plate and the positive electrode collector taken in a short direction of the sealing plate.

As illustrated in FIG. 10, in the square secondary battery 20, the boundary 40 between the base portion 6a and the lead portion 6b is positioned on the first side (the left side in FIG. 10) with respect to the center line C of the sealing plate 2, and the connection 50 between the sealing plate 2 and the positive electrode collector 6 is offset to the second side (the right side in FIG. 10) with respect to the center line C of the sealing plate 2. Accordingly, the connection 50 between the sealing plate 2 and the positive electrode collector 6 is at a position that is farther away from the boundary 40 between the base portion 6a and the lead portion 6b. Accordingly, even in a case in which a strong impact or vibration is applied to the square secondary battery 20, force that moves the electrode body 3 in the square outer package 1 is applied thereto, and the positive electrode collector 6 connected to the electrode body 3 is pulled, the square secondary battery is formed so that the connection 50 between the sealing plate 2 and the positive electrode collector 6 does not easily bear the load. With the above, the square secondary battery becomes more reliable.

Note that the entire connection 50 between the sealing plate 2 and the positive electrode collector 6 does not have to be positioned on the second side (the side opposite to the boundary 40) with respect to the center in the short direction of the sealing plate 2. However, it is more effective when the entire connection 50 between the sealing plate 2 and the positive electrode collector 6 is positioned on the second side (the side opposite to the boundary 40) with respect to the center in the short direction of the sealing plate 2.

As illustrated in FIG. 7 and other drawings, desirably, the connection 50 includes the connection opening 6x provided in the base portion 6a and the projection 2a provided on the sealing plate 2, and, in plan view, the center of the projection 2a is positioned on the second side (the side opposite to the boundary 40) with respect to the center in the short direction of the sealing plate 2. Furthermore, the entire projection 2a is, more desirably, positioned on the second side (the side opposite to the boundary 40) with respect to the center in the short direction of the sealing plate 2.

As illustrated in FIG. 7, in the square secondary battery 20, the projection 2a provided on the sealing plate 2 is fitted to the connection opening 6x provided in the base portion 6a of the positive electrode collector 6. Accordingly, the sealing plate 2 and the positive electrode collector 6 are connected to each other in a firm manner. Furthermore, the edge portion of the connection opening 6x provided in the base portion 6a of the positive electrode collector 6 includes, on the lead portion 6b side, the straight portion 6y extending in the longitudinal direction of the sealing plate 2. Accordingly, when the positive electrode collector 6 is pulled by the electrode body 3 towards a bottom portion of the square outer package 1, concentration of the load to a single point in the connection 50 between the sealing plate 2 and the positive electrode collector 6 can be prevented. The above is preferable since the connection 50 between the sealing plate 2 and the base portion 6a can be effectively prevented from becoming damaged or broken. Note that the straight portion 6y is not an essential component.

Note that desirably, the base portion 6a of the positive electrode collector 6 and the projection 2a of the sealing plate 2 are connected to each other by welding in the straight portion 6y. With such a configuration, the connection 50 between the sealing plate 2 and the positive electrode collector 6 can be effectively prevented from becoming damaged or broken. Furthermore, the portion in the projection 2a that opposes the straight portion 6y of the base portion 6a is, desirably, the projected straight portion 2a1 formed in a linear manner.

Furthermore, the edge portion of the connection opening 6x provided in the base portion 6a of the positive electrode collector 6, desirably, includes two straight portions each extending in the longitudinal direction of the sealing plate 2. Furthermore, in plan view, the outer peripheral edge of the projection 2a of the sealing plate 2, desirably, includes two straight portions each extending in the longitudinal direction of the sealing plate 2. Furthermore, desirably, the two straight portions in the edge portion of the connection opening 6x are disposed so as to oppose the two straight portions of the projection 2a. With such a configuration, the connection 50 between the sealing plate 2 and the positive electrode collector 6 becomes more less likely to become damaged or broken.

Note that the shape of the projection 2a provided on the sealing plate 2 in plan view is not limited to any specific shape; however, the shape thereof is, desirably, elliptic, rectangular, oval, or the like. Note that when rectangular, the edge portions may have a rounded shape. Furthermore, the shape of the connection opening 6x provided in the base portion 6a of the positive electrode collector 6 in plan view is not limited to any specific shape; however, the shape thereof is, desirably, elliptic, rectangular, oval, or the like. Note that when rectangular, the edge portions may have a rounded shape.

Furthermore, a first bend portion 41 and a second bend portion 42 are formed in the lead portion 6b of the positive electrode collector 6. In a case in which the positive electrode collector 6 is pulled by the electrode body 3, the first bend portion 41 and the second bend portion 42 absorb the load; accordingly, application of a load to the connection 50 between the sealing plate 2 and the positive electrode collector 6 can be suppressed in a further effective manner. Note that the first bend portion 41 and the second bend portion 42 each have a linear shape, and each extend in the longitudinal direction of the sealing plate 2 (a front-back direction of FIG. 10). The first bend portion 41 is positioned on the sealing plate 2 side with respect to the second bend portion 42 in a direction perpendicular to the sealing plate 2. Furthermore, the first bend portion 41 is positioned on the outside with respect to the second bend portion 42 in the short direction of the sealing plate 2, in other words, the first bend portion 41 is positioned on the side nearer to a side wall of the square outer package 1. The first bend portion 41 and the second bend portion 42 may be formed before connecting the positive electrode collector 6 to the sealing plate 2, or after the positive electrode collector 6 has been connected to the sealing plate 2. Furthermore, the first bend portion 41 and the second bend portion 42 do not necessarily have to be provided.

First Modification

In the exemplary embodiment according to the square secondary battery 20 described above, an example in which the shape of the projection 2a provided on the sealing plate 2 is elliptic in plan view, and the shape of the connection opening 6x provided in the base portion 6a of the positive electrode collector 6 is elliptic in plan view has been given. A first modification has a configuration similar to that of the square secondary battery 20 according to the exemplary embodiment described above other than that the shape of the projection provided on the sealing plate and the shape of the connection opening provided in the base portion of the positive electrode collector are different from those of the exemplary embodiment.

Figure 11A:
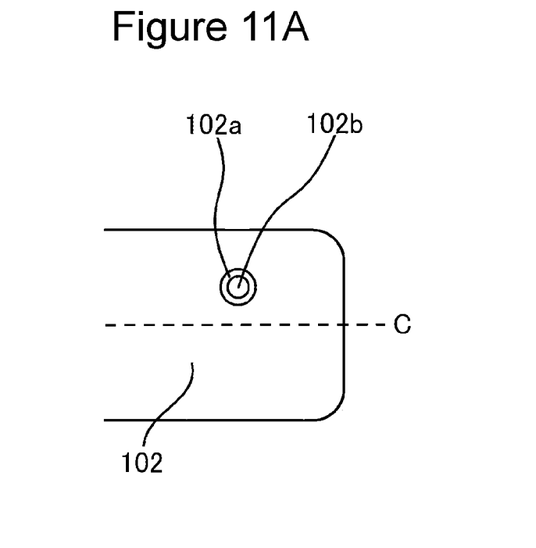
FIG. 11A is a diagram illustrating a battery inner side surface of a sealing plate according to a first modification and is an enlarged view of a portion near a projection.

As illustrated in FIG. 11A, in a first modification, a projection 102a having a perfect circular shape in plan view is provided in a surface of a sealing plate 102 on an inner side of a battery. A distal end recess 102b is provided in a distal end of the projection 102a.

Figure 11B:
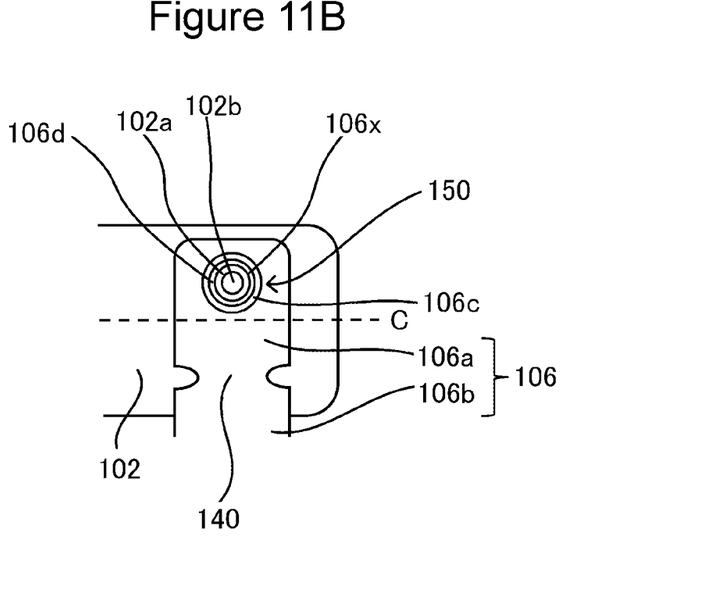
FIG. 11B is a plan view illustrating a state in which the positive electrode collector is disposed on the sealing plate according to the first modification, and is an enlarged view of a portion near a connection between the sealing plate and the positive electrode collector.

As illustrated in FIG. 11B, a positive electrode collector 106 according to the first modification is disposed on a surface of the sealing plate 102 on the inner side of the battery. The positive electrode collector 106 includes a base portion 106a disposed so as to oppose the sealing plate 102, and a lead portion 106b provided at an edge portion of the base portion 106a. A connection opening 106x is provided in the base portion 106a of the positive electrode collector 106. The projection 102a of the sealing plate 102 is disposed inside the connection opening 106x provided in the base portion 106a. Note that an annular thin wall portion 106c is provided around the connection opening 106x. Furthermore, an annular projection 106d is provided in an edge portion of the connection opening 106x. Note that FIG. 11B illustrates a state before the positive electrode collector 106 is bent at a boundary 140 between the base portion 106a and the lead portion 106b.

In the square secondary battery according to the first modification, the boundary 140 between the base portion 106a of the positive electrode collector 106 and the lead portion 106b is, in the short direction of the sealing plate 102, positioned on the first side (the lower side in FIG. 11B) with respect to the center line C of the sealing plate 102, and the connection 150 between the sealing plate 102 and the positive electrode collector 106 is offset to the second side (the upper side in FIG. 11B) with respect to the center line C of the sealing plate 102. Accordingly, even in a case in which a strong impact or vibration is applied to the square secondary battery, force that moves the electrode body 3 in the square outer package 1 is applied thereto, and the positive electrode collector 106 is pulled, application of a load to the connection 150 between the sealing plate 102 and the positive electrode collector 106 can suppressed.

Second Modification

In the exemplary embodiment and the first modification described above, an example in which a projection is provided on a sealing plate, and the projection is fitted to a connection opening provided in a base portion of a positive electrode collector has been given. However, the projection of the sealing plate, and the connection opening in the base portion of the positive electrode collector are not essential components.

Figure 12:
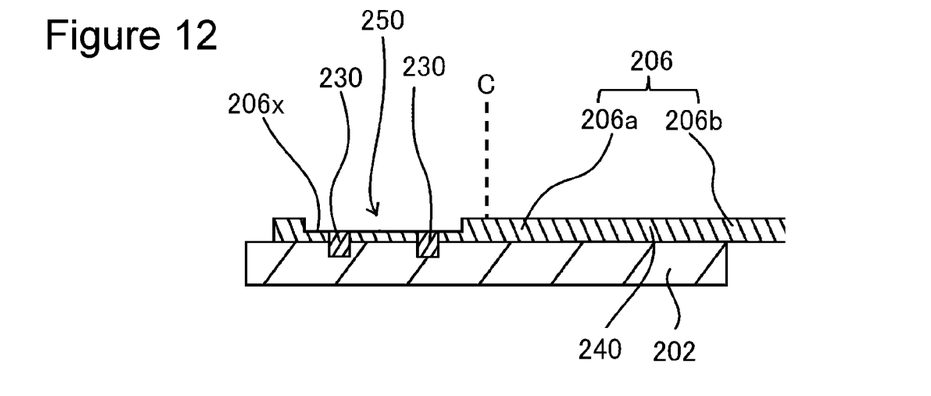
FIG. 12 is a cross-sectional view of a connection between a sealing plate according to a second modification and a positive electrode collector, and is a cross-section taken in a short direction of the sealing plate.

FIG. 12 is a cross-sectional view of a square secondary battery according to a second modification, corresponding to FIG. 8B. In the second modification, a projection is not provided on the sealing plate 202, and a connection opening is not provided in a base portion 206a of a positive electrode collector 206. Note that the second modification has a configuration similar to that of the square secondary battery 20 according to the exemplary embodiment described above other than that the shape of the sealing plate and the shape of the base portion of the positive electrode collector are different from those of the exemplary embodiment.

In the second modification, the sealing plate 202 and the base portion 206a of the positive electrode collector 206 are welded to form a welded connection 230 while the base portion 206a of the positive electrode collector 206 is placed on the sealing plate 202. In the square secondary battery according to the second modification, a boundary 240 between the base portion 206a of the positive electrode collector 206 and a lead portion 206b is, in the short direction of the sealing plate 202, positioned on the first side with respect to the center line C of the sealing plate 202, and a connection 250 between the sealing plate 202 and the positive electrode collector 206 is offset to the second side with respect to the center line C of the sealing plate 202. Accordingly, even in a case in which a strong impact or vibration is applied to the square secondary battery, force that moves the electrode body 3 in the square outer package 1 is applied thereto, and the positive electrode collector 206 is pulled, application of a load to the connection 250 between the sealing plate 202 and the positive electrode collector 206 can be suppressed.

Note that desirably, a thin wall portion 206x is provided in the base portion 206a of the positive electrode collector 206, and the thin wall portion 206x is connected to the sealing plate 202 by welding. One may conceive of providing an opening in the base portion 206a of the positive electrode collector 206, and connecting an edge portion of the opening and the sealing plate 202 to each other by welding.

Third Modification

Figure 13A:
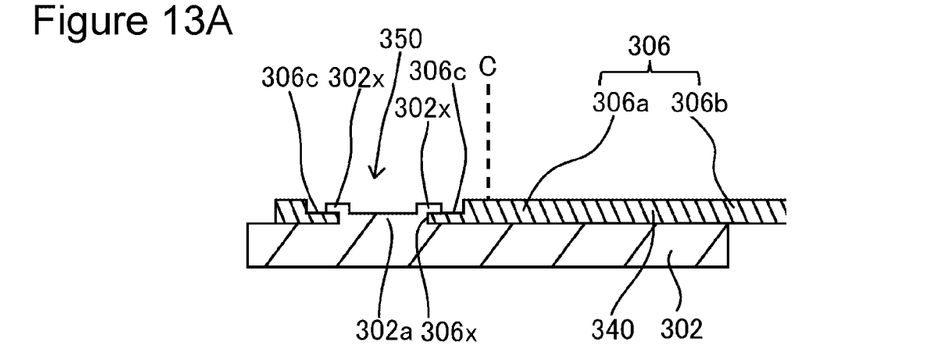
FIG. 13A is a cross-sectional view of a connection between a sealing plate according to a third modification and a positive electrode collector before welding, and is a cross-section taken in a short direction of the sealing plate.
Figure 13B:
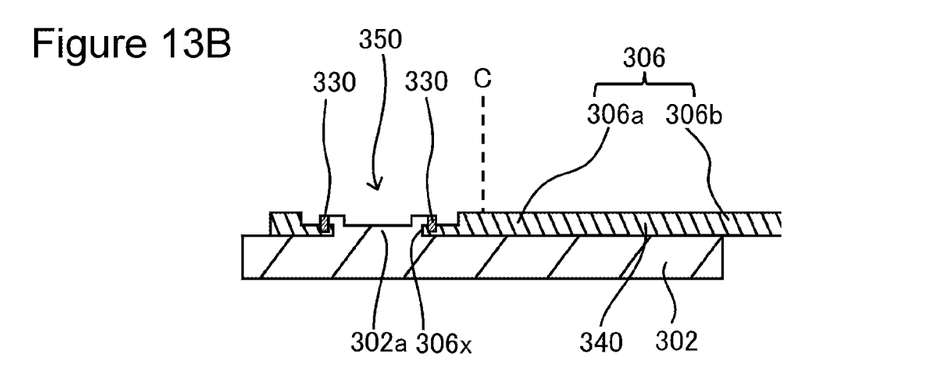
FIG. 13B is a cross-sectional view of the connection between the sealing plate according to the third modification and the positive electrode collector after welding, and is a cross-section taken in the short direction of the sealing plate.

The projection provided on the sealing plate can be fixed on the base portion of the positive electrode collector by riveting. FIG. 13A is a cross-sectional view of a sealing plate 302 and a positive electrode collector 306 according to a third modification before welding and is a cross-sectional view taken along the short direction of the sealing plate 302. FIG. 13B is a cross-sectional view of the sealing plate 302 and the positive electrode collector 306 according to the third modification after welding and is a cross-sectional view taken along the short direction of the sealing plate 302.

As illustrated in FIG. 13A, the sealing plate 302 includes a projection 302a. The positive electrode collector 306 includes a base portion 306a and a lead portion 306b. A connection opening 306x is provided in the base portion 306a. The positive electrode collector 306 is disposed on the sealing plate 302 so that the projection 302a of the sealing plate 302 is fitted to the connection opening 306x. Furthermore, a distal end of the projection 302a is riveted on the base portion 306a such that a riveted portion 302x is formed. Note that desirably, an annular thin wall portion 306c is provided in the base portion 306a around the connection opening 306x. In the above, desirably, the riveted portion 302x does not protrude to the electrode body side from a surface (the surface on the upper side in FIG. 13A) of the base portion 306a on the electrode body side.

Subsequently, the riveted portion 302x provided at the distal end of the projection 302a and the base portion 306a are connected to each other by welding, such that a welded connection 330 is formed as illustrated in FIG. 13B. With such a configuration, the sealing plate 302 and the positive electrode collector 306 are connected to each other in a further firm manner. Accordingly, the square secondary battery with a higher reliability is obtained. Note that in the third modification, a boundary 340 between the base portion 306a of the positive electrode collector 306 and a lead portion 306b is, in the short direction of the sealing plate 302, positioned on the first side with respect to the center line C of the sealing plate 302, and a connection 350 between the sealing plate 302 and the positive electrode collector 306 is offset to the second side with respect to the center line C of the sealing plate 302. Accordingly, even in a case in which a strong impact or vibration is applied to the square secondary battery, force that moves the electrode body in the square outer package is applied thereto, and the positive electrode collector 306 is pulled, application of a load to the connection 350 between the sealing plate 302 and the positive electrode collector 306 can suppressed.

Others

In the exemplary embodiment and the modifications described above, examples in which the sealing plate and the positive electrode collector are connected to each other are given. However, the sealing plate and the negative electrode collector can be connected to each other with a similar method. In such a case, the sealing plate and the positive electrode collector are insulated from each other.

The mode of the electrode body is not limited to any mode in particular and the electrode body may be a wound electrode body or a stacked electrode body.

The positive electrode plate, the negative electrode plate, the separator, the electrolyte, and the like may have known configurations.

A plurality of the square secondary battery described above may be used to form a battery pack. In such a case, desirably, a pair of large area side walls of the square outer package in each square secondary battery is pressed from both sides such that each electrode body is pinched by the pair of large area side walls. With such a configuration, the electrode bodies can be suppressed from moving inside the square outer packages when a strong impact or vibration is applied to the square secondary batteries. Accordingly, application of a load to the connections between the sealing plates and the positive electrode collectors can be suppressed.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:
1. A square secondary battery comprising:
an electrode body that includes a first electrode plate and a second electrode plate;
a square outer package that includes an opening and that houses the electrode body;
a sealing plate that seals the opening; and
a collector connected to the first electrode plate,
wherein the collector includes
a base portion disposed to oppose the sealing plate, and
a lead portion that extends from an edge portion of the base portion towards the electrode body,
wherein the sealing plate and the base portion are connected to each other,
wherein in a short direction of the sealing plate, a boundary between the base portion and the lead portion is positioned on a first side with respect to a center of the sealing plate, and a connection between the sealing plate and the base portion is offset to a second side with respect to the center of the sealing plate, and
wherein the connection between the sealing plate and the base portion overlaps the boundary between the base portion and the lead portion in the short direction of the sealing plate.

2. The square secondary battery according to claim 1,
wherein a connection opening is formed in the base portion,
wherein a projection is formed on a surface of the sealing plate on an electrode body side,
wherein the projection is disposed inside the connection opening,
wherein the projection and the base portion are welded to each other, and
wherein the connection includes the projection and the connection opening.

3. The square secondary battery according to claim 2,
wherein in the short direction of the sealing plate, the projection is entirely positioned on the second side with respect to the center of the sealing plate.

4. The square secondary battery according to claim 2,
wherein a distal end recess is formed in a distal end of the projection.

5. The square secondary battery according to claim 2,
wherein an annular thin wall portion is provided around the connection opening,
wherein an annular projection is formed in an edge portion of the connection opening, and
wherein the annular projection is welded to the base portion.

6. The square secondary battery according to claim 1,
wherein the lead portion is provided with a first bend portion and a second bend portion that extend in a longitudinal direction of the sealing plate,
wherein in a direction perpendicular to the sealing plate, the first bend portion is positioned on a sealing plate side with respect to the second bend portion, and
wherein in the short direction of the sealing plate, the first bend portion is positioned on an outer side with respect to the second bend portion.

7. A method of manufacturing a square secondary battery according to claim 1, the method comprising:
a first step of connecting the sealing plate and the base portion to each other so that a connection between the sealing plate and the base portion is formed at a position offset from a center of the sealing plate in a short direction of the sealing plate,
a second step of, after the first step, bending the collector and setting a state in which, in the short direction of the sealing plate, a boundary between the base portion and the lead portion is positioned on a first side with respect to a center of the sealing plate, and the connection is offset to a second side with respect to the center of the sealing plate, and
a third step of connecting the first electrode plate to the lead portion after the second step.

8. The method of manufacturing a square secondary battery according to claim 7,
wherein in the first step, using the collector in which a connection opening is formed in the base portion, and the sealing plate on which a projection is formed, the projection is disposed inside the connection opening and the projection and the base portion are welded to each other.

9. The method of manufacturing a square secondary battery according to claim 8,
wherein in the short direction of the sealing plate, the projection is entirely positioned on the second side with respect to the center of the sealing plate.

10. The method of manufacturing a square secondary battery according to claim 7,
wherein the lead portion is provided with a first bend portion and a second bend portion that extend in a longitudinal direction of the sealing plate,
wherein in a direction perpendicular to the sealing plate, the first bend portion is positioned on a sealing plate side with respect to the second bend portion, and
wherein in the short direction of the sealing plate, the first bend portion is positioned on an outer side with respect to the second bend portion.

* * * * *